United States Patent [19]

Enderby

[11] Patent Number: 5,510,718
[45] Date of Patent: Apr. 23, 1996

[54] CONTAINER LEAK TESTING

[76] Inventor: George R. Enderby, Orchard Way, Teddington Gloucestershire GL20 8JA, England

[21] Appl. No.: 256,554
[22] PCT Filed: Feb. 8, 1993
[86] PCT No.: PCT/GB93/00257
  § 371 Date: Jul. 15, 1994
  § 102(e) Date: Jul. 15, 1994
[87] PCT Pub. No.: WO93/19353
  PCT Pub. Date: Sep. 30, 1993

[30] Foreign Application Priority Data

Mar. 24, 1992 [GB] United Kingdom .................... 9206387

[51] Int. Cl.$^6$ ....................................................... G01M 3/40
[52] U.S. Cl. ................................................. 324/536; 73/40
[58] Field of Search ..................................... 324/551, 554, 324/713, 536; 73/40

[56] References Cited

U.S. PATENT DOCUMENTS 3,252,572  5/1966  Erren .
4,677,372  6/1987  Meguro et al. ............................ 324/54

FOREIGN PATENT DOCUMENTS 2338192   8/1974  Germany .
63-011850 1/1988  Japan .

Primary Examiner—Hezron E. Williams
Assistant Examiner—Jay L. Politzer
Attorney, Agent, or Firm—Young & Thompson

[57] ABSTRACT

Apparatus for leak testing a blow molded container comprises an electrically conductive probe for extending into the interior of the container through an opening and electrically conductive earth plates for surrounding at least a major portion of the container. In order to test the container, the probe is introduced into the container by an actuator, the earth plates are placed in close proximity with the container walls by means of actuators and a high voltage is applied to the probe by way of a connecting lead. A current sensor is responsive to the occurrence of a spark between the probe and the earth plates thereby indicating the presence of a hole or weakness in the intervening container wall. Such apparatus can be implemented at relatively low cost and is highly reliable in practice, as well as requiring only a short testing cycle.

11 Claims, 3 Drawing Sheets

+Kv.

CONTAINER LEAK TESTING

BACKGROUND OF THE INVENTION

1. Field of the Invention

This invention relates to leak testing of containers, and is particularly, but not exclusively, concerned with the leak testing of blow molded containers.

2. Description of the Related Art

It is an inherent feature of the blow molding process used for producing plastics bottles and the like that small holes are sometimes formed in the container walls due to the occurrence of flaws in the molding medium. It is therefore essential, in applications in which the container is required to be fluid tight, that each container is subjected to leak testing prior to use. Conventionally such leak testing is performed on a conveyor line by initially pressurising each container with air and subsequently detecting by means of a pressure transducer any decay of the pressure within the container which might indicate the occurrence of a leak. While this leak method operates satisfactorily in practice, it requires use of a pressure transducer which is both costly and delicate. Also, since the method requires monitoring of the pressure within the container over a period of a few seconds, the period of each testing cycle cannot be decreased below a certain value.

SUMMARY OF THE INVENTION

It is an object of the invention to provide generally improved apparatus and methods for leak testing such containers.

According to the present invention there is provided apparatus for leak testing a container comprising an electrically conductive probe for communicating with the interior of the container by way of an opening of the container, electrically conductive shield means for location externally of the container, electrical connection means for application of a high voltage between the probe and the shield means, and sensor means for detecting current flowing between the probe and the shield means indicating the presence of a hole or weakness in the intervening container wall, and characterised in that the electrical connection means is arranged to apply the high voltage to the probe, and that moving means is provided for effecting relative displacement of the container and the shield means so as to surround at least a major portion of the container with the shield means.

Such apparatus can be implemented at relatively low cost and is highly reliable in practice. It is capable of detecting not only very small holes in the container wall, but also weaknesses in the container wall provided that a sufficiently high voltage is used. Since the occurrence of current flow in the form of a spark is almost instantaneous in the event of a hole or weakness being detected, the apparatus may be incorporated in a conveyor line and mechanised in such a manner that each testing cycle takes place in a relatively short period of time. The spark corresponds to a breakdown of insulation between the two conductors such as to cause a current discharge between the conductors under the applied electric field.

The probe advantageously has a form which ensures that parts of the probe are located in close proximity to the inside wall of the container at a plurality of locations during testing. For example the probe may include an inflatable electrically conductive balloon, or a plurality of electrically conductive strands capable of spreading out under the influence of a static charge, or even a plurality of mechanically actuable electrically conductive vanes.

The shield means may comprise electrically conductive plates or electrically conductive foam pads or electrically conductive brushes for conforming to the external profile of the container. In a further alternative the shield means may comprise a plurality of parts which are electrically insulated from one another and connected to earth (ground) by respective discriminating means so as to enable the approximate location of the hole or weakness to be detected by the sensor means.

The moving means preferably comprises a plurality of mechanical actuators for moving associated parts of the shield means into close proximity with the outside wall of the container. Each actuator may be a pneumatic or hydraulic piston and cylinder, or an electromagnetically operated actuator.

Further moving means may be provided to introduce the probe into the container through the opening and may include an actuator of any of the types referred to above. Also the probe may be provided with an electrically insulating cover to close off the container opening during testing.

In addition conveyor means may be provided for moving the container into a testing station and for subsequently moving the container out of the testing station after leak testing of the container.

The invention also provides a method of leak testing a container, such as a blow molded container, comprising placing an electrically conductive probe in communication with the interior of the container by way of an opening of the container, applying a high voltage between the probe and electrically conductive shield means located externally of the container, and detecting current flow between the probe and the shield means indicating the presence of a hole or weakness in the intervening container wall, characterised in that the high voltage is applied to the probe, and that relative displacement of the container and the shield means so as to surround at least a major portion of the container with the shield means is effected prior to application of the high voltage.

BRIEF DESCRIPTION OF THE DRAWINGS

In order that the invention may be more fully understood, apparatus in accordance with the invention will now be described, by way of example, with reference to the accompanying drawings, in which.

DESCRIPTION OF THE PREFERRED EMBODIMENTS

The illustrated apparatus is intended for leak testing plastics containers which have been produced by extrusion blow molding, by injection stretch blow molding or by any similar molding process. Generally the molded plastics containers are supplied along a conveyor line to a testing station in which each container is leak tested by the apparatus before being supplied to a discharge station or a reject station, depending on the result of the test.

Figure 1:
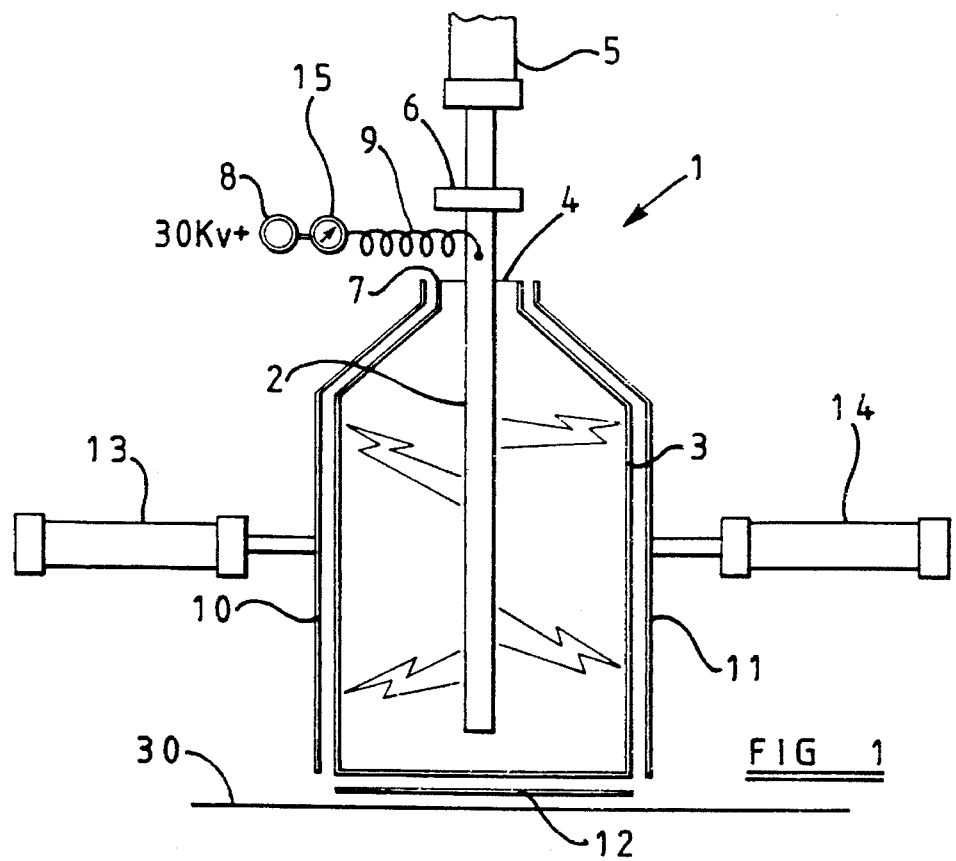
FIG. 1 is a schematic diagram of a first embodiment.

Referring to FIG. 1, the leak testing apparatus 1 comprises an electrically conductive probe 2 which is lowered into the interior of the container 3 to be tested through an opening 4 of the container by means of an actuator 5 which is typically a pneumatic cylinder or electrical lead screw arrangement. The probe 2 is integrally formed with an electrically insulating cover 6 which seals with the rim 7 surrounding the opening 4 of the container when the probe is fully introduced into the container. In addition a high voltage source 8 applies a high voltage of 30 KV or more to the probe 2 by means of an electrical connecting lead 9.

At the same time as the probe 2 is introduced into the container 3, shield plates 10, 11 and 12 are moved into positions in which they lie closely adjacent to the outer walls of the container 3 so that the container is substantially surrounded by these plates 10, 11 and 12. Typically the plates 10 and 11 are shaped to conform to the external profile of the container 3 over approximately 180° of arc, whereas the plate 12 is simply a flat plate onto which the container 3 is moved when it enters the testing station. Respective actuators 13 and 14, which may be pneumatic cylinders, for example, are provided for moving the plates 10 and 11 into the positions in which they surround the container 3, and for subsequently withdrawing the plates 10 and 11 to enable the container 3 to be moved out of the testing station and a further container to be introduced into the testing station by means of the conveyor line 30.

In operation the high voltage of 30 KV or more is applied to the probe 2, and the current flow along the electrical connecting lead 9 is sensed by a current sensor 15 to determine whether a spark has been generated between the probe 2 and any of the plates 10, 11 and 12 indicating a hole or weakness in the intervening container wall.

Thus the current sensor 15 provides an electrical output indicative of whether or not the container wall contains a leak or weakness, and this output may be used to operate a suitable diverter, if required, in order to divert the container 3 outputted from the testing station either towards a discharge zone or towards a reject zone, depending on whether or not a hole or weakness was detected in the container. The magnitude of the voltage applied to the probe 2 may be varied depending on whether it is required simply to detect holes in the container wall or whether it is also required to detect weaknesses (in which case a higher voltage is required). Since the output signal from the current sensor 15 will be proportional to the spark intensity, it is also possible for a visual output to be provided which is indicative of the magnitude of the current sensed and hence indicative of whether a hole or weakness (and the degree of weakness) has been detected.

Figure 2:
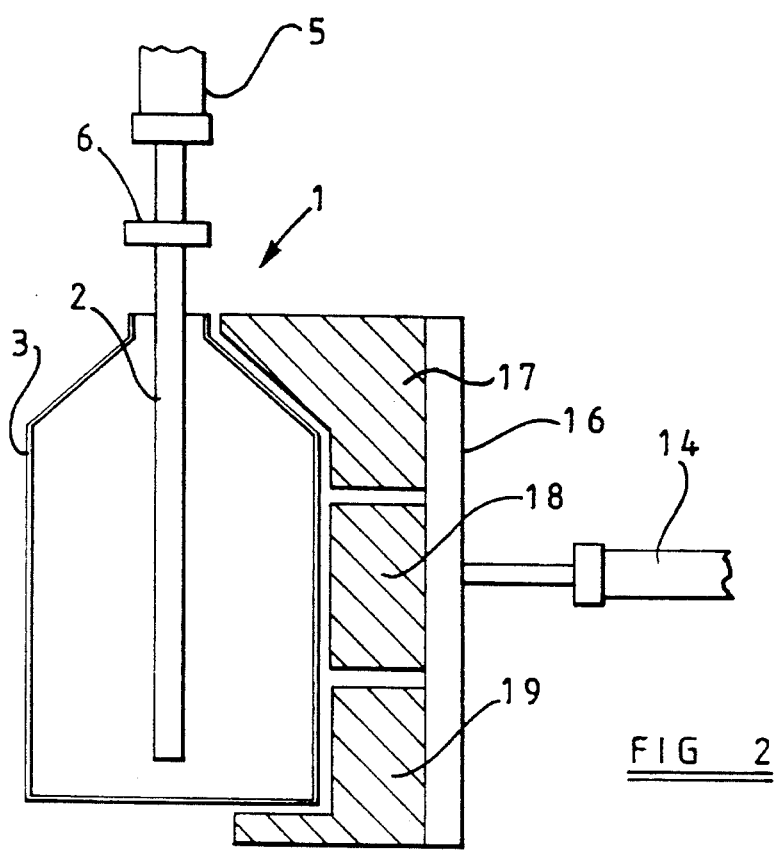
FIG. 2 is a schematic diagram of parts of a second embodiment.

FIG. 2 shows, in part, a second embodiment in which each of the plates 10, 11 is replaced by an electrically conductive member 16 bearing a series of electrically conductive foam pads 17, 18 and 19 having an inner profile adapted to the external profile of the container 3. These pads 17, 18 and 19 are resilient and thereby enable closer contact with the outside of the container.

Figure 3:
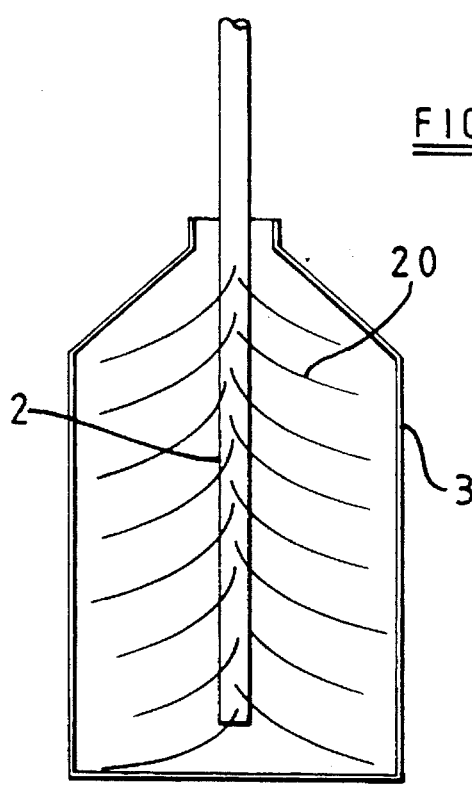
FIGS. 3 and 4 are schematic diagrams of parts of two variant embodiments.
Figure 4:
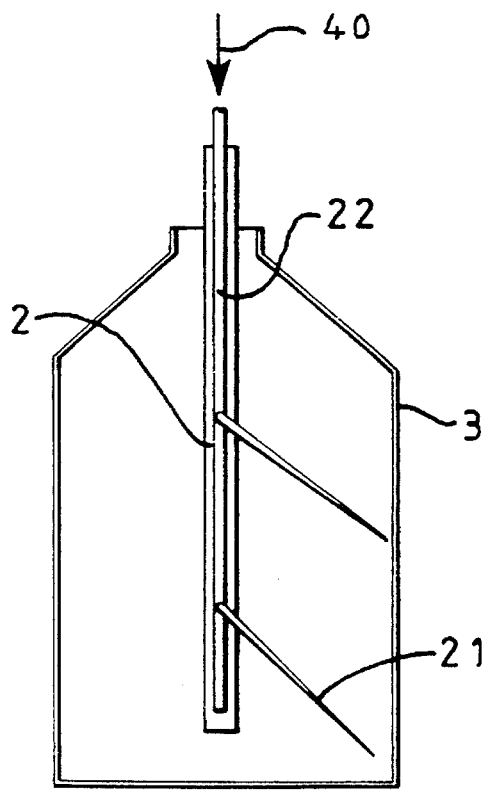

FIG. 3 shows a modification of the probe 2 within the container 3 to permit parts of the probe 2 to be located in close proximity to the inside wall of the container 3 at a plurality of locations during testing in order to increase the sensitivity of detection of holes or weaknesses in the container wall. In this case flexible foil strands 20 are secured along that part of the probe 2 within the container 3 so that, when a high voltage is applied to the probe, the foil strands 20 will tend to spread out under the influence of static charge as shown in the figure. Alternatively a probe 2 as shown in FIG. 4 may be used. Such a probe has a series of electrically conducting rigid vanes 21, only two of which are shown in FIG. 4, which are pivotally connected to an inner actuating rod 22 within the actuator 2. After introduction of the probe 2 into the container 3 with the vanes 21 in an inner pivotal position, the actuating rod 22 may be moved in the direction of the arrow 40 to cause the vanes 21 to be pivoted into any outer pivotal position as shown in the figure.

Figure 5:
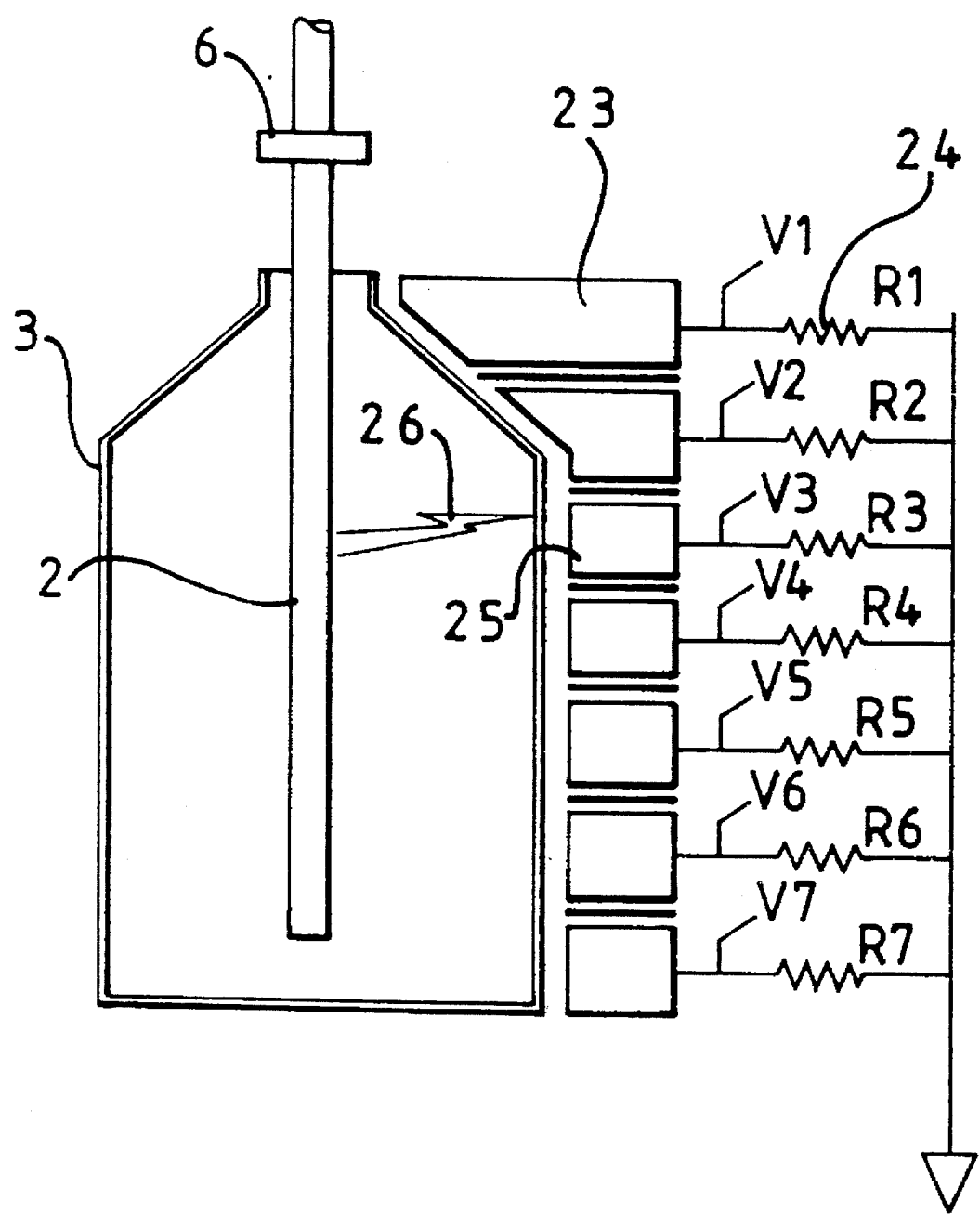
FIG. 5 is a schematic diagram of parts of a further embodiment.

FIG. 5 shows another version of the apparatus which is adapted not only to indicate the occurrence of a hole or weakness in the container wall, but also to provide an indication of the position of the hole or weakness. In this case each shield plate is divided into a series of electrically conductive pads 23 each of which is connected to earth (ground) by an associated resistor 24 having a resistance which is different to the resistances of the resistors associated with the other pads 23. Thus, if a hole or weakness exists in the container wall in the vicinity of a pad 25, for example, a spark 26 will be generated and this will produce a voltage V3 at the pad 25 due to the current flowing through the resistor R3. Since the resistance values of the various resistors 24 differ, the current sensed on occurrence of such a spark will provide an indication of which of the pads 23 is closest to the hole or weakness detected.

In another possible version of the apparatus, the probe 2 may be provided with an integral injection nozzle for injecting water mist into the container 3 at the same time as the probe is introduced into the container. The water mist in the container increases the effectiveness of spark formation.

The electrical discharge testing method possesses a number of advantages over existing methods, such as pressure decay testing or underwater bubble testing. Amongst these advantages are:

1. Rapid detection of holes or imperfections since an electrical discharge occurs in less than a millisecond.
2. Ability to locate very small holes of less than 0.1 mm, and even to detect thin areas which might potentially become holes.
3. Ability to provide an indication of approximate hole position if required.
4. Increased reliability since delicate transducers are not required.
5. Sterility which is particularly advantageous in the case of containers for medical application.

I claim:

1. Apparatus for leak testing a container comprising an electrically conductive probe (2) for communicating with an interior of the container (3) by way of an opening (4) of the container, electrically conductive shield means (10, 11, 12; 16, 17, 18, 19; 23) closely surrounding the container and movable between open and closed positions, electrical connection means (9) for application of a high voltage relative to the shield means, and sensor means (15) for detecting current flow between the probe and the shield means indicating the presence of at least one of a hole and a weakness in an intervening wall of the container, and moving means (13, 14) for moving the shield means between the open position permitting introduction or removal of the container into or from the shield means and the closed position in which at least a major portion of the container is closely surrounded by the shield means.

2. Apparatus according to claim 1, wherein the probe (2) has a form which ensures that parts of the probe are located in close proximity to an inside wall of the container (3) at a plurality of locations during testing.

3. Apparatus according to claim 2, wherein the probe (2) includes a plurality of electrically conductive strands (20) capable of spreading out under an influence of a static charge.

4. Apparatus according to claim 1, wherein the shield means comprises one of electrically conductive plates (10, 11, 12), foam pads (17, 18, 19) and brushes.

5. Apparatus according to claim 1, wherein the shield means comprises a plurality of parts (23) which are electrically insulated from one another and connected to earth by respective resistance means (24) so as to enable an approximate location of at least one of the hole and weakness to be detected by the sensor means (15).

6. Apparatus according to claim 1, wherein the moving means comprises a plurality of mechanical actuators (13, 14) for moving associated parts of the shield means (10, 11, 12; 16, 17, 18, 19; 23) into close proximity with an outside wall of the container (3).

7. Apparatus according to claim 1, wherein further moving means (5) is provided to introduce the probe (2) into the container (3) through the opening (4).

8. Apparatus according to claim 1, wherein the probe (2) is provided with an electrically insulating cover (6) to close off the container opening (4) during testing.

9. Apparatus according to claim 1, wherein conveyor means (30) is provided for moving the container into a testing station and for subsequently moving the container (3) out of the testing station after leak testing of the container.

10. A method of leak testing a container comprising a step of placing an electrically conductive probe (2) in communication with an interior of the container (3) by way of an opening (4) of the container, a step of closely surrounding at least a major portion of the container with electrically conductive shield means (10, 11, 12; 16, 17, 18, 19; 23) in a closed position, a step of detecting current flow between the probe and the shield means indicating the presence of at least one of a hole and a weakness in an intervening wall of the container, and a step of moving the shield means from the closed position into an open position permitting introduction or removal of the container into or from the shield means.

11. Method according to claim 10, wherein said container is a blow molded container.

* * * * *